United States Patent [19]
Swanson

[11] Patent Number: 5,619,368
[45] Date of Patent: Apr. 8, 1997

[54] OPTICAL FREQUENCY SHIFTER

[75] Inventor: Eric A. Swanson, Acton, Mass.

[73] Assignee: Massachusetts Inst. of Technology, Cambridge, Mass.

[21] Appl. No.: 542,570

[22] Filed: Oct. 13, 1995

Related U.S. Application Data

[63] Continuation of Ser. No. 442,374, May 16, 1995, abandoned.

[51] Int. Cl.$^6$ ............................................. G02F 1/35
[52] U.S. Cl. ......................... 359/326; 359/332; 385/122
[58] Field of Search ............................... 359/326–332; 356/345, 349, 350; 385/122

[56] References Cited

U.S. PATENT DOCUMENTS

| | | | |
|---|---|---|---|
| 4,775,215 | 10/1988 | Teng et al. | 359/326 X |
| 4,976,507 | 12/1990 | Udd | 359/326 X |
| 5,058,986 | 10/1991 | Nayar et al. | 385/122 X |
| 5,146,517 | 9/1992 | Avramopoulos et al. | 385/122 X |

OTHER PUBLICATIONS

Shibata et al., "Phase–Mismatch Dep. of Eff. of Wave Gener. Through 4–Wave Mixing in a Single Mode Optical. Fiber," IEEE Jnl. of Quant. Elect., V. QE–23, No. 7, pp. 1205–1210, Jul. 1987.

Henry, "Optical wavelength division multiplex," Globecom '90, 'Comm.: Connecting the Future,' San Diego, CA, V. 3, pp. 1508–1511, Dec. 1990.

Le et al., "Ultrafast, room–temp., resonance–enhanced third–order opt. susceptibility tensor of an AlGaAs/GaAs quantum well", Opt. Lett., V. 16, N. 12, pp. 901–903, Jun. 15, 1991.

Schnabel et al., "Multiterahertz freq. conversion of a picosec. pulse train using nonlinear gain dyn. in a 1.5 μm MQW semicond. laser. amp." Elect. Lett., V. 29, No. 9, pp. 821–822, Apr., 1993.

Alexander et al., "A Precompetitive Consortium on Wide-Band All–Optical Networks," Jnl. of Lightwave Tech., V. 11, N. 56, pp. 714–735, Jun., 1993.

Iannone et al., "Broadband wavelength shifter for picosecond optical pulses at 1.5 μm," Elect. Lett., V. 29, N. 17, pp. 1518–1519, Aug. 1993.

Li et al., "Conversion efficiency and bandwidth of THz optical frequency conversion in a semiconductor laser," IEE Proc.–J., V. 140, N. 4, pp. 260–266, Aug., 1993.

Hasegawa et al., "Polarization Independent Frequency Conv. by Fiber 4–Wave Mixing with a Polarization Diversity Tech.," IEEE Phot. Tech. Lett., V. 5, N. 8, pp. 947–949, Aug., 1993.

Yasaka et al., "Broad–range wavelength conv. of 10 Gbit/s signal using a superstructure grating distr. Bragg reflector laser," Elect. Lett., V. 30, N. 2, pp. 133–134, Jan., 1994.

Watanabe et al., "Highly efficient conv. and parametric gain of nondegenerate forward 4–wave mixing in a single mode fiber," Elect. Lett., V. 30, N. 2, pp. 163–164, Jan., 1994.

(List continued on next page.)

Primary Examiner—John D. Lee
Attorney, Agent, or Firm—Theresa A. Lober

[57] ABSTRACT

An optical wavelength converter is provided that utilizes an optical interferometer configured to efficiently and rapidly shift the frequency of an optical signal and to automatically separate a pump signal from the optical signal and a frequency-shifted signal. The wavelength converter is configured with a signal port for accepting an input optical signal, of a first wavelength, to be processed for producing an output signal of a second wavelength, and a pump port for accepting a laser pump signal of a pump wavelength. An optical interferometer is connected to the signal and pump ports to separately receive the input signal from the signal port and a pump signal from the pump port and to inject each received signal independently into a nonlinear medium. In the nonlinear medium, the input and pump signals nonlinearly interact via a nonlinear optical property of the nonlinear medium to generate an output conjugate signal of a second wavelength.

27 Claims, 10 Drawing Sheets

OTHER PUBLICATIONS

Ludwig et al., "BER measurements of freq. converted signals using 4-wave mixing in a semiconduct. laser amp. at 1, 2.5, 5, & 10 Gbit/s," Elect. Lett., V. 30, No. 4, pp. 338–339, Feb., 1994.

Wedding et al., "Dispersion–supported transmission at 1550 nm on long spans of conventional single mode fiber," OFC '94, Tech. Digest Series, Conf. Ed., pp. 58–59, Feb., 1994.

McMillen et al., "Application requirements for an all-optical network," OFC '94, Tech. Digest Series, Conf. Ed., pp. 65–70, Feb., 1994.

Kaminow et al., "Early results of the research consortium on wideband all-optical networks," OFC '94, Tech. Digest Series, Conf. Ed., pp. 84–86, Feb., 1994.

Bao et al., "Fabrication and characterization of polarization–maintaining fiber Fabry–Perot interferometers," OFC '94, Tech. Digest Series, Conf. Ed., pp. 96–98, Feb., 1994.

Li et al., "Crosstalk penalty in an all-optical network using dynamic wavelength routers," OFC '94, Tech. Digest Series, Conf. Ed., pp. 174–176, Feb., 1994.

Inoue, "Polarization–insensitive wavelength conversion using fiber 4–wave mixing with two orthogonal pumps at diff. freq.," OFC '94, Tech. Digest Series, Conf. Ed., pp. 251–252, Feb. 1994.

Jopson et al., "Polarization–Independent Mid–System Spectral Inversion in a 2–Channel 10–Gb/s, 560–km Trans. System," OFC '94, Tech. Digest, Postdeadline Papers, pp. PD22 1–4, Feb., 1994.

Inoue et al., "Polarisation insensitive wavelength conversion using a light injected DFB–LD with a loop configuration," Elect. Lett., V. 30, N. 5, pp. 438–439, Mar., 1994.

Morioka et al., "Polarisation–indendpent 100Gbit/s all-opt. demultiplexer using 4–wave mixing in a polarisation–maintaining fiber loop," Elect. Lett., V. 30, N. 7, pp. 591–592, Mar., 1994.

Swanson et al., "A 1 THz Fiber Frequency Shifter for WDM Optical Networks," LEOS Summer Topical Meeting Digest on Int. Optoelectronics, Lake Tahoe, NV, pp. 72–73, Jul., 1994.

Donnelly et al., "Nondegenerate four–wave mixing wavelength conversion in low–loss passive InGaAsP/InP waveguides," LEOS '94 7th Ann. Meet., Bos., MA, V. 2, pp. 330–331, Oct. 1994.

Swanson et al, "A Fiber Freq. Shifter with Broad Bandwidth, High Cov. Eff., Pump and Pump ASE Cancellation, and Rapid Tunabilty for WDM Optical Networks," IEEE Phot. Tech. Lett., V. 6, N. 11, pp. 1341–1343, Nov., 1994.

5,619,368

OPTICAL FREQUENCY SHIFTER

GOVERNMENT RIGHTS IN THE INVENTION

This invention was made with U.S. Government support under Air Force Contract No. 63250F. The U.S. Government has certain rights in this invention.

This application is a continuation of application Ser. No. 08/442,374, filed on May 16, 1995, now abandoned.

FIELD OF THE INVENTION

This invention relates to shifting of optical frequencies, and more particularly relates to optical frequency shifters.

BACKGROUND OF THE INVENTION

All-optical fiber-based communication network designs typically include hierarchies of linked local subnetworks and long haul routes, some of which may simultaneously operate at the same optical wavelength because of their physical separation. Wavelength division multiplexing is employed by such a network for maximizing signal capacity of the various network routes and subnetworks. The network signal capacity may be further increased by use of local subnetworks that are reconfigurable to accommodate any one of a range of optical frequencies at a given time, depending on the most efficient frequency configuration of the network at that time. Such reconfigurability further results in improved flexibility of routing protocols used to direct signals across the network and thereby improves routing efficiency.

Fundamental building blocks for such a multi-frequency optical communications network are efficient optical frequency shifters. In addition to shifting of frequencies for routing to subnetwork links, frequency shifters are required for phase conjugation operations employed over long haul routes, as well as for various types of optical processing, e.g., optical logical components for performing Boolean functions.

A variety of optical frequency conversion techniques have been demonstrated, but each of these exhibits one or more performance limitations. For example, one historically common approach employs electrical detection of an optical frequency followed by frequency remodulation of a separate laser. This electrical detection technique is inherently limited by the speed of electronics, which cannot yet meet the terahertz capabilities of optical fiber, and importantly, cannot easily accommodate multiple wavelengths simultaneously.

In another known frequency conversion technique, gain saturation of a semiconductor amplifier is employed as an optical frequency modulator. Like the electrical detection technique, such an amplifier gain saturation technique has limitations in that its frequency conversion is modulation-dependent, its speed is limited by electrical carrier effects, and in a conventional configuration, it cannot accommodate multiple wavelengths simultaneously.

The simplicity and availability of dispersion shifted fiber has enabled several fiber-based frequency shifter techniques which utilize four wave mixing of an input signal and a pump signal in a length of fiber to produce a conjugate signal to the input signal, the conjugate signal, by definition, being at a frequency shifted from that of the input signal. Four wave mixing is a well-known nonlinear optical phenomenon in which two or more signals interact, due to a nonlinear medium, e.g. a medium exhibiting a nonlinear index of refraction, in which they signals are mixed, to generate conjugate signal frequencies as a function of the input signal frequencies.

In one such scheme, shown by Inoue in "Polarization-insensitive wavelength conversion using fiber four-wave mixing with two orthogonal pumps at different frequencies," in OFC '94, February 1994, pp. 251–252, two pump lasers are polarization multiplexed and then combined with an optical signal whose frequency is to be shifted. The pump-signal combination is then input to a length of fiber; four wave mixing of the pumps and the signal take place due to the nonlinear index of refraction of the fiber as the fiber length is traversed to produce a conjugate to the input signal having a frequency determined by the pump and input signal frequencies. At the fiber output, optical filters are required to separate the desired frequency-shifted conjugate signal from the pump signals and the input signal.

In an alternative scheme, shown by Hasegawa et al. in "Polarization independent frequency conversion by fiber four-wave mixing with a polarization diversity technique," in *IEEE Photon. Tech. Lett.*, v. 5, n. 8, August 1993, pp. 947–948, an optical signal to be frequency shifted is first combined with a pump laser signal and then the combined signal is injected into a loop of dispersion-shifted fiber for four wave mixing of the signal components. A polarizing beam splitter (PBS) is used to inject the combined signal into the loop such that one polarization component of the combination signal travels clockwise around the loop and the other polarization component of the combination signal travels counterclockwise around the loop. Hasegawa relies on pre-combination of pump and input signals so that the PSB identically polarizes the pump and input signals as they are injected in combination into each arm of the loop. The input signal, pump signal, and conjugate signal generated by four wave mixing in the loop all exit the PBS at a common exit port, thereby requiring optical filtering to separate out the desired conjugate signal.

Morioka, in "Polarisation-independent 100 Gbit/s all-optical demultiplexer using four-wave mixing in a polarisation-maintaining fibre loop," *Elect. Lett.*, v. 30, n. 7, March. 1994, pp. 591–592, show a similar scheme that uses a loop of polarization-maintaining dispersion-shifted fiber to produce four wave mixing of an input signal and a pump signal. Like Hasegawa, Morioka first combines the input signal and pump signal and then injects the combined signal to the fiber loop through one port of a PBS. Here, however, the pump, input signal, and generated conjugate signal together exit the PBS at the same port through which they were injected. A Faraday circulator is employed to isolate the input signal from the combination output signal, which must be filtered to eliminate the pump signal and produce the desired frequency-shifted conjugate signal.

All of these fiber-based conversion schemes are limited because in each case, the output of the frequency shifter must be filtered to eliminate the pump signal from the output channel of the shifter. Additionally, these schemes require filtering of the pump signal before it is combined with an input signal to suppress any pump amplified spontaneous emission (ASE) associated with the pump. As a practical matter, pump ASE can be expected to leak through the system and so must additionally be filtered out of the output channel. Any pump or pump ASE coupled into the output channel can result in a severe decrease of as much as 20 dB in the signal-to-noise ratio of the frequency-shifted signal, and further results in interference of the pump signal with other channels that are wavelength division multiplexed with the frequency-shifted output channel signal.

The optical pump and pump ASE filtering required by the fiber-based conversion schemes described above inherently limits the overall performance of these conversion schemes. Firstly, the complexity of the conversion systems are increased by the pumps because each additional filter component in the conversion system must be precisely aligned and tuned on-the-fly to accommodate a specific frequency to be converted at a given time. Additionally, due to inherent nonideal filtering by the optical filters, the overall conversion efficiency of the system is correspondingly reduced by the filters.

But perhaps most critically, optical filters available at this time require a finite amount of time for on-the-fly filter frequency tuning, and so significantly reduce the speed of conversion of these systems. As a result, the speed of an optical logic operation or the speed with which an optical subnetwork using the conversion schemes may be reconfigured to accommodate a network-commanded frequency shift is accordingly reduced. The design of an efficient, high-speed frequency shifter having a high signal-to-noise ratio has thus remained a daunting optical processing challenge met with only suboptimal results.

SUMMARY OF THE INVENTION

The invention provides an optical wavelength converter that utilizes an optical interferometer configured to efficiently and rapidly shift the frequency of an optical signal and to automatically separate a pump signal from the optical signal and a frequency-shifted signal. In one aspect, the wavelength converter of the invention is configured with a signal port for accepting an input optical signal, of a first wavelength, to be processed for producing an output signal of a second wavelength, and a pump port for accepting a laser pump signal of a specific wavelength. An optical interferometer is connected to the signal and pump ports to separately receive the input signal from the signal port and a pump signal from the pump port and to inject each received signal independently into a nonlinear medium. In the nonlinear medium, the input and pump signals nonlinearly interact via a nonlinear optical property of the nonlinear medium to generate an output conjugate signal of a second wavelength.

This optical frequency shifter configuration overcomes limitations of past frequency shifter designs by injecting an input signal separately from a pump signals into a nonlinear medium; this separate injection ensures that not only the pump signal, but also any amplified spontaneous emission associated with the pump signal is introduced to the nonlinear medium separated from the input signal. As a result of this configuration, the optical frequency shifter of the invention achieves superior conversion speed, reduced pump and pump ASE leak through to output channels, superior conversion efficiency, and importantly, the ability to accommodate rapid frequency reconfiguration of a wavelength division multiplexed optical network.

In particular embodiments, the optical interferometer of the wavelength converter is connected to the signal port and pump port to emit the input signal and the output conjugate signal out of the signal port and to separately emit the pump signal out of the pump port. The nonlinear medium preferably consists of material that produces four wave mixing of the input signal and the pump signal, and more particularly, the optical interferometer consists of a fiber loop mirror, a Mach Zehnder interferometer, a Michelson interferometer, a waveguide, or a semiconductor component, used alone or positioned along the length of a fiber loop mirror.

In other particular embodiments, the optical interferometer consists of a fiber loop mirror and a polarization controller is positioned along the fiber loop for maintaining the loop mirror in a polarization-balanced condition. Preferably, the fiber loop mirror consists of a loop of single-mode dispersion-shifted optical fiber, characterized by a zero-dispersion wavelength equal to a wavelength between the input signal wavelength and the desired conjugate signal wavelength, and is of between 1 m and 10 km in length. More preferably, the fiber length is between 500 m and 8 km.

In other particular embodiments a Faraday circulator is provided, having a first port configured to accept an input signal and direct that signal to the signal port, and having a second port connected to the signal port to output the generated output conjugate signal. The signal and pump ports preferably are ports of a 50/50 optical coupler. In other embodiments a tunable optical filter is provided for filtering the conjugate signal output at the second port of the Faraday circulator, and a tunable optical filter is provided for filtering the pump signal before it is accepted at the pump port.

In other embodiments, a tunable laser pump source is provided for generating a pump signal to be accepted at the pump port. An optical amplifier is provided to amplify the pump signal before it is accepted at the pump port; preferably, this fiber consists of a length of rare earth-doped optical fiber. In particular embodiments, a pair of independently tunable laser pump sources is provided-for generating a combined pump signal to be accepted at the pump port.

The optical wavelength converter of the invention is preferably adaptable to accept digital or analog input signals, as well as an input signal that itself comprises a plurality of signals. In particular embodiments, the input signal and the pump signal each consist of a pulse train and the input signal pulse train is synchronized in time and phase with the pump signal pulse train. The nonlinear medium here preferably consists of a material that produces nonlinear interaction of the input and pump signal pulse trains, whereby a conjugate output signal is produced that itself comprises a pulse train representing a logical ANDing of the input and pump signal pulse trains. In other particular embodiments, the input signal is carried by a first optical fiber, and the converter provides a switch connected to the signal port to direct the conjugate output signal to a second optical fiber.

The optical wavelength converter of the invention is applicable to a wide range of optical communication and optical processing systems.

BRIEF DESCRIPTION OF THE DRAWINGS

The invention is pointed out with particularity in the appended claims. The above and further features and advantages of the invention may be better understood by referring to the following description of preferred embodiments and the accompanying drawings, in which:

DESCRIPTION OF THE PREFERRED EMBODIMENTS

Figure 1:
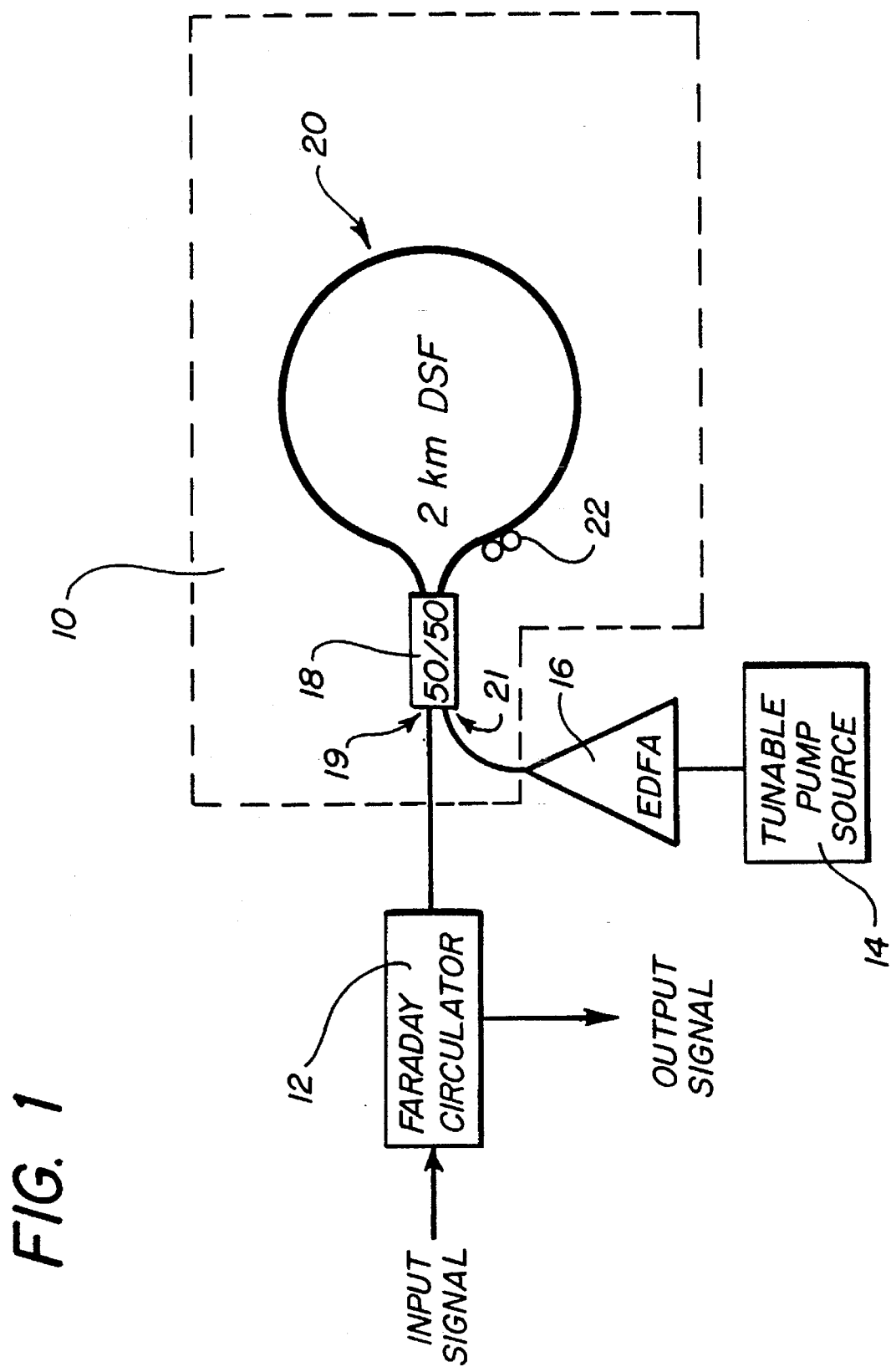
FIG. 1 is a schematic illustration of an optical frequency shifter according to the invention including a loop mirror.

A fiber frequency shifter in accordance with the present invention is shown in FIG. 1, with reference numeral 10. The system employs four wave mixing of an input signal and a pump signal to generate an output signal whose frequency is shifted based on the frequency of the input and pump signals. An optical signal whose frequency is to be shifted is input to the system via, e.g., one port of a Faraday circulator 12 configured to provide two or more ports, or through another suitable input coupler. Such a Faraday circulator is available from JDS corporation as model number CR 1500-FP. The second port of the Faraday circulator is configured to introduce the input signal to the frequency shifter 10, whose operation is described below.

In one scheme according to the invention, a tunable laser pump source 14 is configured to provide a laser pump input to the system for mixing with the input signal. The laser is preferably tunable such that accommodation of various frequency shifts may be enabled by one and the same laser, but other laser configurations are also feasible. Suitable pump lasers include external cavity lasers, DFB lasers, and rapidly tunable distributed Bragg reflection lasers, among others. An ATT tunable DFB laser, model M246AH, is one acceptable pump laser, and is best-suited for applications requiring tuning over only a narrow frequency range. Depending on the power of the laser pump source, a fiber amplifier, such as an erbium-doped fiber amplifier (EDFA) 16 may be employed to boost the laser pump power. For example, the ATT DFB laser may be amplified by a commercially available EDFA such as the Amoco 1.5 Amp, 24 dBm fiber; other suitable amplifier mechanisms are also acceptable.

In the frequency shifter 10, an optical coupler 18, e.g., a Gould polarization-independent 50/50 coupler, provides separate coupling ports 19, 21, for separate coupling of the input signal and the pump signals, respectively, into a nonlinear optical medium, here shown as an optical fiber loop mirror 20. The fiber loop mirror comprises, e.g., a length of dispersion-shifted balanced fiber, such as Corning Single-Mode Fiber Dispersion-Shifted (SMF-DS) fiber, or other dispersion-shifted fiber, which acts as a two-arm interferometer. While not required, it is preferable for the selected fiber to exhibit polarization-maintaining characteristics.

Figure 2A:
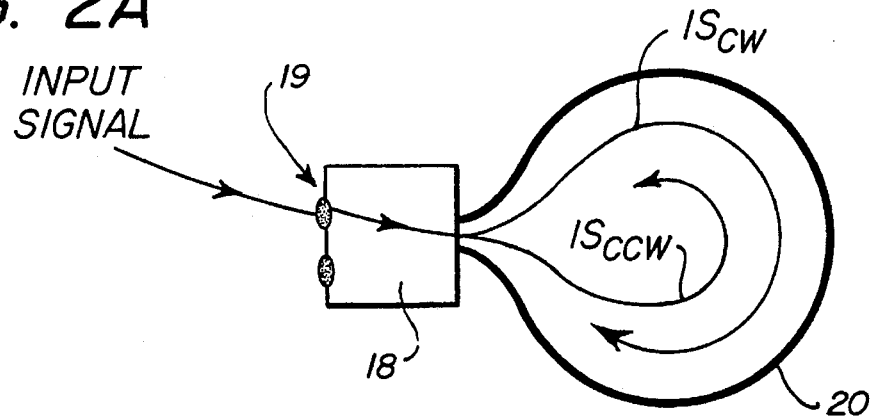
FIGS. 2A–2C are schematic illustrations of input signal, conjugate signal, and pump signal paths in the optical frequency shifter of FIG. 1.
Figure 2B:
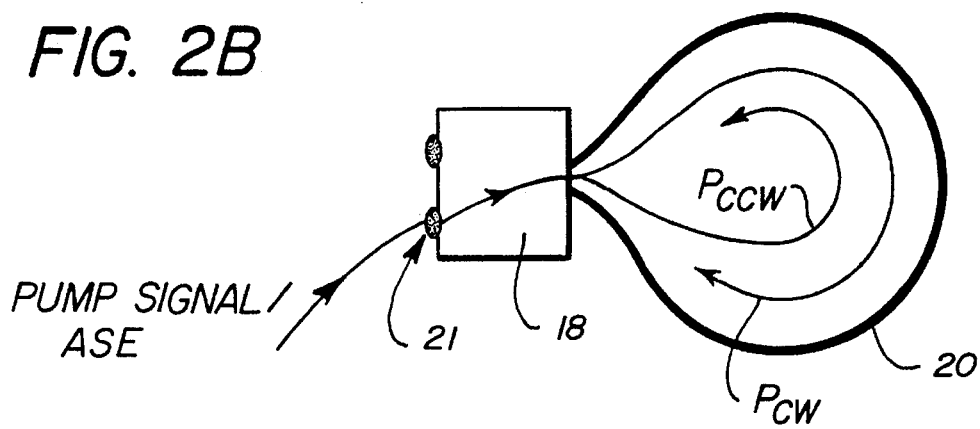

Referring also to FIG. 2A, with this optical loop mirror coupling scheme, one-half of the input signal power is injected from the input signal coupling port 19 to one arm, say the upper arm, of the loop mirror while the other half of the input signal power is injected to the lower arm of the loop mirror, thereby producing one input signal component, $IS_{cw}$, that traverses the loop in a clockwise direction, and a second input signal component, $IS_{ccw}$, that traverses the loop in a counter clockwise direction. As shown in FIG. 2B, one-half of the pump signal power is separately injected from the pump signal coupling port 21 to the upper arm of the loop mirror, with the remaining half of the pump signal power being separately injected in the lower arm. Two pump signal components, $P_{cw}$ and $P_{ccw}$, thereby also traverse the loop in opposite directions. This coupling scheme is in stark contrast with prior frequency shifter designs, e.g., the Morioka and Hasegawa designs described earlier, in which pump and input signals are pre-combined, before injection into a frequency shifting mechanism, to produce a unitary combination signal that is later processed by the frequency shifting mechanism.

In the loop mirror coupling of the invention, separate input and pump signal injection ensures that not only the pump signal, but also any amplified spontaneous emission (ASE) associated with the amplified pump signal are injected separately from the input signal. No pre-filtering of the pump signal is therefore required. Preferably, a 50/50 coupling is provided by the coupler; this prescribes even use of the pump and signal power in the conversion mechanism, as described below.

The clockwise and counter-clockwise components of both the injected input signal and pump signal are phase matched in the mirror loop by appropriate choice of fiber length, fiber dispersion zero, and frequency separation, as discussed in more detail below and as will be understood by those skilled in the art. The clockwise and counterclockwise components of the input and pump signals generate a conjugate signal through nonlinear four wave mixing of the signals as they traverse the optical loop mirror, as explained in detail below. Back at the coupler 18, the clockwise and counter clockwise components of the input signal recombine, while the clockwise and counter-clockwise components of the pump signal also recombine.

Figure 2C:
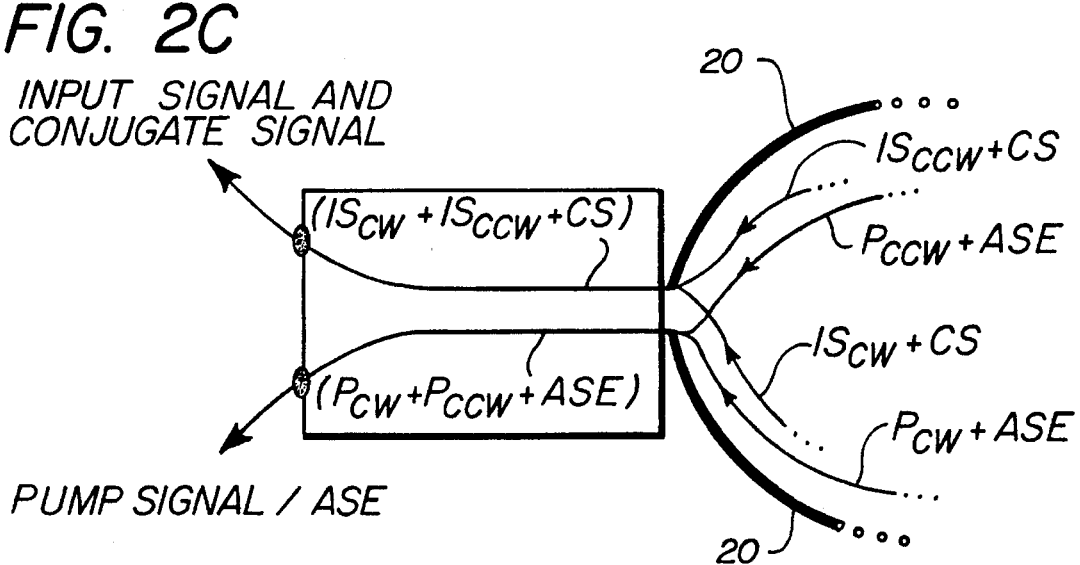

Referring to FIG. 2C, with proper polarization alignment of the loop mirror, provided by, e.g., a polarization controller 22 (FIG. 1), or with use of polarization maintaining (PM) fiber and alignment of the input and pump polarization with the fiber PM, the clockwise and counter-clockwise components of the input and generated conjugate signals interfere such that the pump and ASE signals are canceled at the input signal coupling port 19 and only the recombined input signal components, $IS_{cw}$ and $IS_{ccw}$, and the conjugate signal, CS, are reflected out of that port 19. Similarly, the components of the pump and pump ASE signals interfere such that the input and conjugate signals are canceled at the pump signal coupling port 21 and only the recombined pump signals $P_{cw}$ and $P_{ccw}$ and any pump ASE signals are reflected out of that port 21. The fiber loop mirror of the invention thereby provides automatic output separation of the input and conjugate signals from the pump and any pump ASE signals without the use of a filter.

Figure 3A:
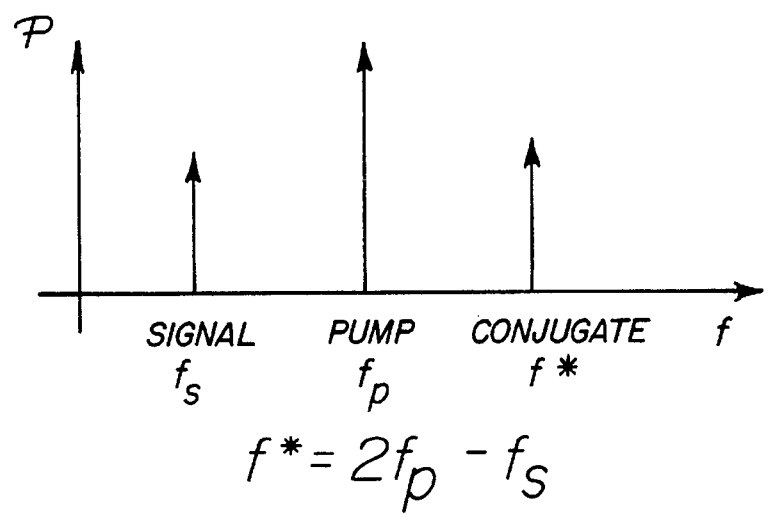
FIGS. 3A and 3B are graphical representations of the relationship between input, conjugate, and pump signal powers and frequencies as a result of four wave mixing produced by the optical frequency shifter of FIG. 1.

Considering now the conjugate signal produced by four wave mixing of the input signal and the pump signal in the fiber loop mirror, and referring also to FIG. 3A, the generated conjugate signal is at a frequency f* equal to the difference between twice the pump frequency and the input signal frequency, as prescribed by four wave mixing theory. In addition, the four wave mixing provides an amplified conjugate signal power. In an illustrative example of four wave mixing produced by the optical loop mirror of the invention, a pump signal at a wavelength of 1555 nm and a power of less than 100 mW, mixed with an input signal at a wavelength of 1550 nm and a power of about 1 mW produces a conjugate signal at a wavelength of approximately 1560 nm with a power of more than 30 μW, using a 2 km-long loop mirror of single-mode dispersion-shifted fiber exhibiting a dispersion zero of 1555 nm.

Figure 3B:
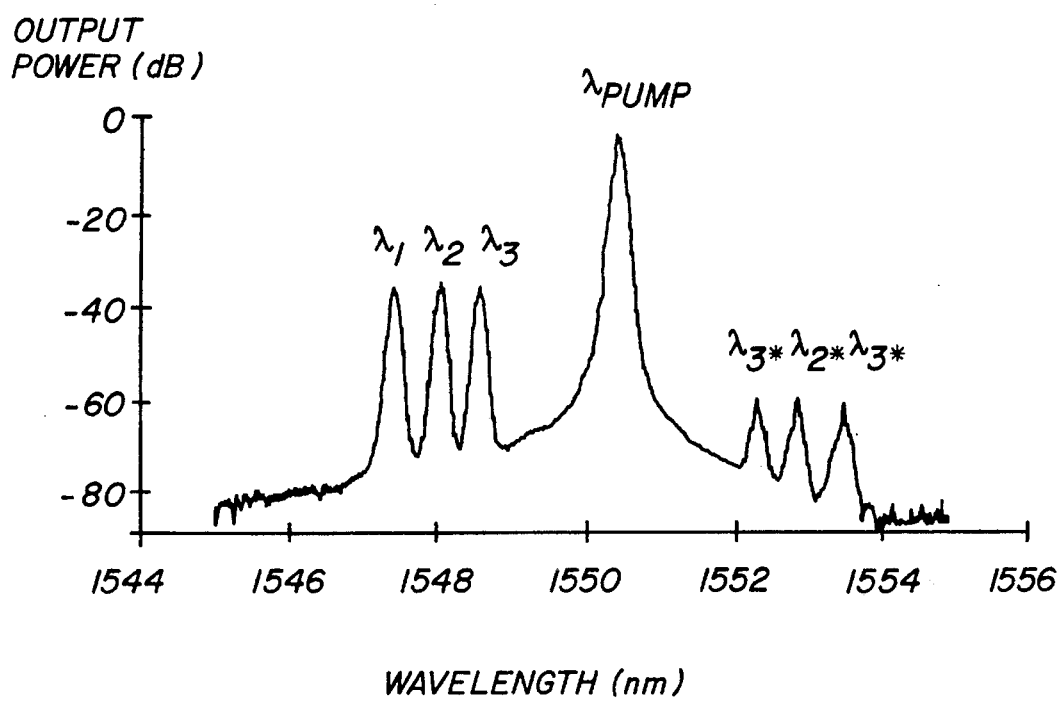

As shown in FIG. 3B, this amplified conjugate generation mechanism extends beyond a single input signal wavelength to a bank or block of input signals each at a distinct wavelength, e.g., $\lambda_1$, $\lambda_2$, and $\lambda_3$, as shown in the figure. Given such a three-way simultaneous input, four wave mixing in the fiber loop mirror of the invention provides corresponding conjugate signals at shifted wavelengths $\lambda_1^*$, $\lambda_2^*$, and $\lambda_3^*$, all output at the input signal port 19 of the coupler 18 separated from the pump signal and any pump ASE.

Assuming no pump depletion, no fiber loss, small frequency translations, and linear dispersion slope around the dispersion zero of the fiber, a simplified equation for frequency conversion efficiency, G, of four wave mixing in a length of single-mode dispersion-shifted fiber is given approximately by:

$$G=(\gamma P_o L)^2 \text{Sinc}^2(\Delta B L/2\pi),$$

where $$\Delta B=(2\pi\lambda_p^2 c)(\Delta f)^2 D(\lambda_p) \text{ and } \gamma=2\pi n_2/\lambda_p A_{\text{eff}},$$

and $P_o$ is the pump power; L is the fiber length; $\lambda_p$ is the pump wavelength; $\Delta f$ is the frequency offset of the input signal from the pump; $D(\lambda_p)$ is the fiber dispersion at the pump wavelength (ps/nm-km); $n_2$ is the nonlinear index of refraction; c is the speed of light; and $A_{\text{eff}}$ is the effective area of mixing.

Figure 4:
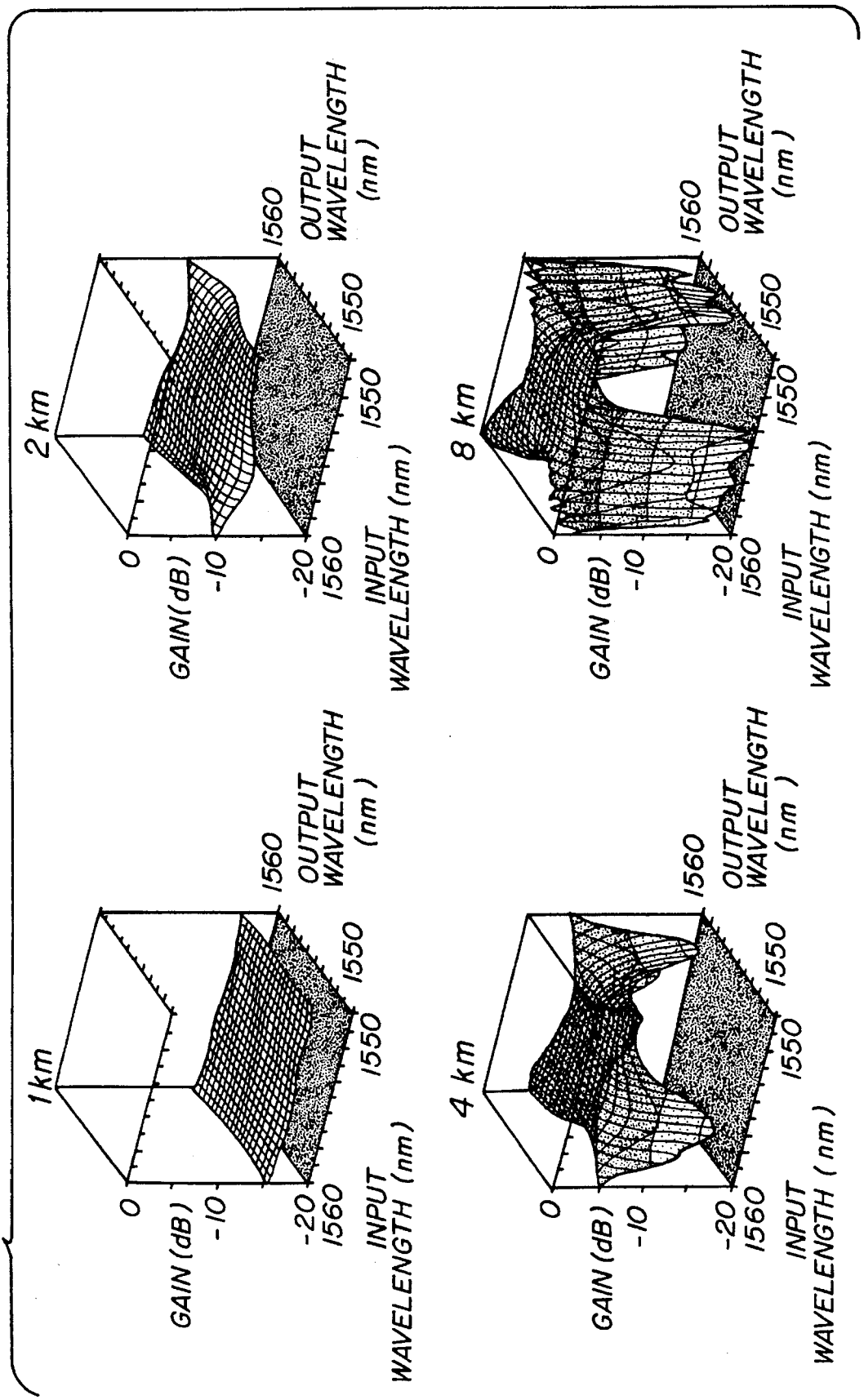
FIG. 4 is a graphical representation of the relationship between optical frequency conversion efficiency, input signal wavelength, and conjugate signal wavelength, for a 1 km, 2 km, 4 km, and 8 km length of single mode dispersion-shifted fiber.

FIG. 4 illustrates this general relationship, highlighting the tradeoffs between frequency conversion gain, input wavelength, and desired output wavelength for a 1 km length of fiber, a 2 km length of fiber, a 4 km length of fiber, and an 8 km length of fiber, all assuming $\gamma=3.28$ (W-km)$^{-1}$, a dispersion zero of the loop fiber of 1555 nm, a dispersion slope of the fiber length of 0.085 ps/(kn-nm$^2$), and 50 mW of pump power injected in the length of fiber. These interrelationships must be considered to determine an optimum mirror loop length for other given system parameters. The gain-bandwidth tradeoff with fiber length is clearly apparent from the figure. For large fiber lengths, high conversion efficiency is only obtained for small conversion frequencies or frequency conversion symmetric about the dispersion zero of the fiber. Based on these tradeoffs, it is seen that extremely good results are produced for a fiber length of 2 km and a pump power of 50 mW; between −10 and −13 dB of conversion gain is obtained over a 10 nm, or 1.24 THz, input and output wavelength space. In applications where, as described above, a fixed frequency block rather than a single frequency is to be converted to another fixed frequency, it is possible to obtain even larger frequency excursions, beyond even 5 THz, by operating the pump wavelength near the dispersion zero of the fiber length. As will be understood by those skilled in the art, the invention is not limited to a particular fiber loop mirror length or operating wavelength; for a given application, suitable length and operational wavelength tradeoffs may be made—a loop length of between 1 m and 10 km, or other loop length, is acceptable.

Referring now back to FIG. 1, the fiber mirror loop 20 is provided with a selected fiber length based on the considerations discussed above, to produce efficient four wave mixing and generation of a conjugate signal at a frequency shifted from that of the input signal. As explained above, a polarization controller 22, available from, e.g., Photonetics, may be positioned in the loop to balance out any residual birefringence along the loop length, thereby ensuring that effective interference and contrast is obtained upon reflection and subsequent combining of the clockwise and counterclockwise components of the input signal and reflection and subsequent combining of the clockwise and counterclockwise pump and pump ASE signals.

At this point it must be emphasized that using this scheme, the frequency shifter of the invention provides an output signal with little or no component due to the pump signal and pump ASE, even without the use of pump or output filters. Through the novel and advantageous use of a balanced two-arm optical loop mirror as a four wave mixing mechanism, separate injection and output of input and conjugate, pump and pump ASE signals is automatically accomplished, substantially reducing or eliminating the need for any input pump filters or output filters. This elegantly simple design reduces system complexity while achieving superior conversion speed; frequency tuning rate is not limited by filter tuning time and so can be tuned as rapidly as tuning of the pump laser will allow, typically in a time span of less than 10 nanoseconds.

While the pump and pump ASE signals are automatically separated from the conjugate signal output by the fiber loop mirror, the input signal remains with the conjugate signal. This condition is useful for a broad range of applications where both input and conjugate signals may be together required, such as in optical network multicast protocol schemes. In applications where both input and conjugate signals are not required, a filter (not shown), that is preferably tunable, may optionally be positioned at the output of the Faraday circulator (12 in FIG. 1) to eliminate the input signal component from the conjugate signal; this filter is not required by the invention, however. Even with use of such an output filter, the loop mirror frequency shifter of the invention provides superior conversion efficiency and increased signal-to-noise ratio over prior frequency converters.

Figure 5:
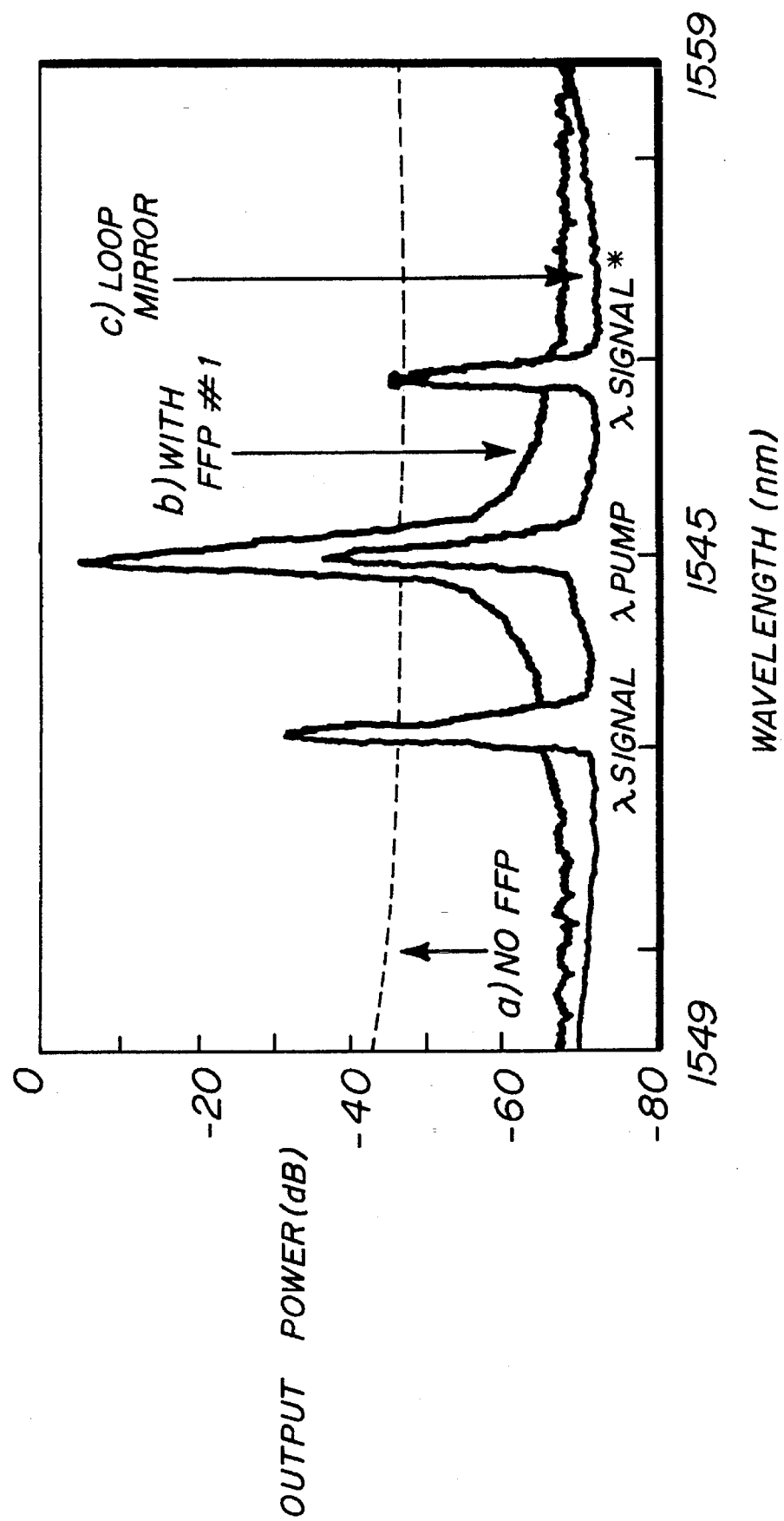
FIG. 5 is a graphical representation of the output power spectrum produced by the optical frequency shifter of FIG. 1 and two prior frequency shifter configurations.

FIG. 5 provides a direct comparison of the conversion performance achieved by the frequency shifter of the invention with that of a conventional prior fiber shifter design that relies on only linear length of fiber for four wave mixing of a precombined input/pump signal and that uses a pump and ASE filter. Curve a) indicates the output power spectrum of a prior conventional frequency shifter where a pump with an erbium doped fiber amplifier moderately deep into saturation is used and neither the pump power nor the ASE power are filtered out of the output channel. Note that the conjugate output signal is here swamped by the pump and ASE signals.

Curve b) indicates the output power spectrum of a prior conventional frequency shifter where a 20 GHz FWHM bandwidth optical filter is included to eliminate unsuppressed ASE in the pump channel before combining pump and input signals to produce a unitary input signal-pump signal combination for injection in a length of fiber. While it is true that here the signal-to-noise ratio of the frequency-shifted output signal is dramatically increased over that of the case for curve a), the slow tuning speed and throughput loss of the pump filter results in severe restriction of frequency reconfiguration speed for an optical network employing such a frequency shifter, reduced conversion gain, as explained above, and increased cost associated with increased system complexity.

Curve c) indicates the power spectrum of the frequency shifter configuration of the invention using a nonlinear medium, e.g., an optical loop mirror. The signal-to-noise ratio of the conjugate output signal is here improved by more than 30 dB over that of the other systems whose power spectra are shown; i.e., the high power pump, having a power of as much as 100 mW, is suppressed in the output by more than 30 dB. This pump power suppression is particularly advantageous for reducing the risk of the pump signal power damaging or interfering with components subsequent to the frequency shifter configured to process the frequency shifter output signal.

The inherent and measurable rejection of pump and pump ASE power provided by the frequency shifter of the invention may be limited by imperfections in the optical loop mirror, e.g., in an offset of the splitting ratio of the optical coupler or in birefringence along the optical mirror loop. Thus, in applications where extremely precise output signals are required, a pump filter and/or output filter may be additionally optionally employed with the configuration of the invention to achieve a maximum filtering of pump and pump ASE from the output signal. Such filtering is not required by the invention, however.

Figure 6:
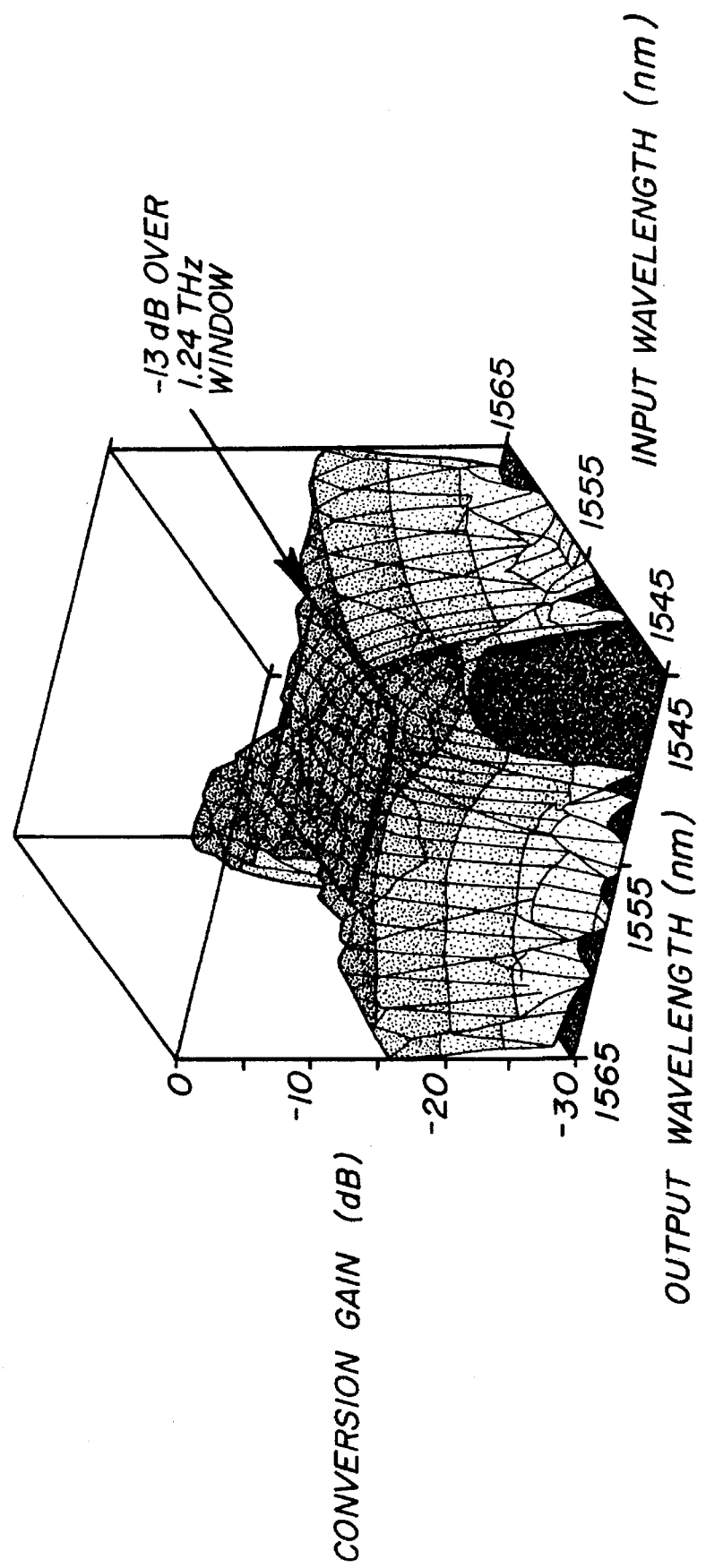
FIG. 6 is a graphical representation of the relationship between optical frequency conversion efficiency, input signal wavelength, and conjugate signal wavelength for the optical frequency shifter of FIG. 1 including a 2 km fiber loop mirror.

FIG. 6 illustrates the conversion gain of the frequency shifter of the invention, based on the gain relationships given previously, over a 10 nm input and output wavelength space, for a 2 km loop mirror of single mode fiber that is dispersion shifted at a zero dispersion wavelength of 1555 nm, and using approximately 125 mW of pump power. As shown in the figure, approximately −13 dB of conversion gain is achieved over the 10 nm of bandwidth. As explained above, this superior gain and signal-to-noise ratio is obtained simultaneously with elimination of pump and pump ASE filters. In particular, significant pump power that would normally be lost due to throughput loss of a pump filter is instead in the invention added to the four wave mixing mechanism, thereby increasing conversion efficiency. Indeed, the conversion efficiency of the frequency shifter of the invention is calculated to be only −6 dB lower than that of an ideal converter, while for a typical fiber converter using a linear length of fiber and pump and output filters, conversion efficiency is calculated to be more than 8.2 dB lower than that of an ideal converter; an ideal converter being one that uses all available power in the four wave mixing process.

Figure 7:
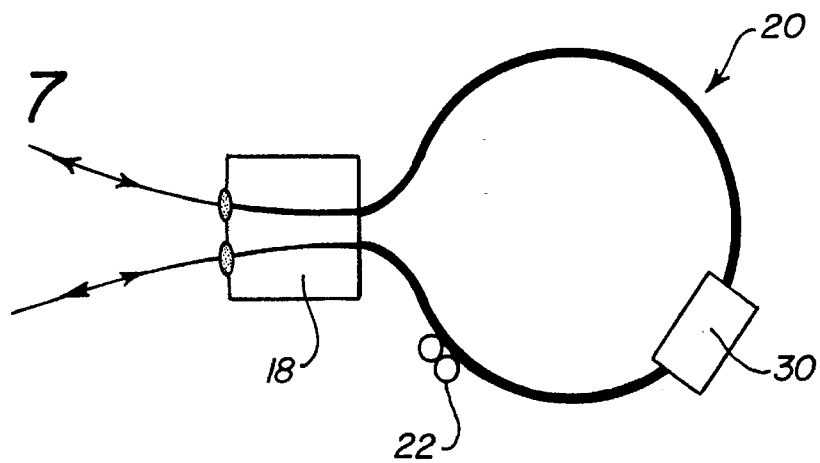
FIG. 7 is a schematic illustration of a second optical frequency shifter according to the invention, including a nonlinear element positioned along a loop mirror.

As will be recognized by those skilled in the field, the frequency shifting technique of the invention may be carried out on a wide range of interferometric configurations, and the frequency shifter embodiment of the invention described above may be adapted for various system requirements. For example, as shown in FIG. 7, the optical loop mirror 20 of the frequency shifter may include a nonlinear element 30, e.g., a semiconductor or other element characterized by a nonlinear index, positioned at a point along the length of the mirror loop 20. Inclusion of such a nonlinear element provides additional signal mixing and thereby results in a corresponding reduction of the required loop length; the loop length may, e.g. be reduced from 2 km to only 1 cm with the use of an appropriate semiconductor element.

In addition to size advantages, a loop mirror including a nonlinear element exhibits a lower latency than a loop mirror containing only fiber. This latency characteristic may be important for optical switching and computing applications, like those described below, that rely on high speed optical processing.

In an alternative embodiment of the invention, a minimum latency is provided by a frequency shifting interferometer fully integrated on a substrate. Here, an InGaAsP/InP waveguide or other suitable substrate material defines an interferometer that provides input, conjugate, and pump signal separation and that effectively mixes the input and pump signals.

Figure 8:
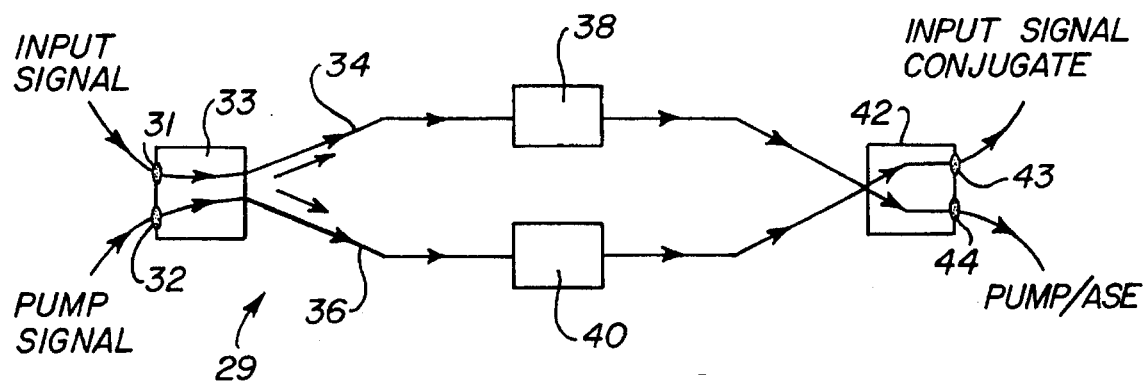
FIG. 8 is a schematic illustration of a third optical frequency shifter according to the invention, configured as a Mach Zehnder interferometer.

Turning to other adaptations of the frequency shifter of the invention, FIG. 8 illustrates a second interferometer according to the invention, here using a Mach Zehnder interferometer configuration. As shown in the figure, an input signal to be frequency-shifted and a pump signal are separately and independently coupled into the interferometer via input coupling ports 31, 32, respectively, in a first coupler 33. The input signal and pump signal then each traverse two parallel and identical fiber lengths 34, 36, each optionally including a nonlinear element 38, 40, respectively, e.g., a semiconductor element.

Four wave mixing of the input signal and the pump signal, as described above, occurs along the two fiber lengths to produce a conjugate signal. At a second coupler 42 the pump and associated ASE are canceled at a input/conjugate signal output port 43, while the input and conjugate signals are canceled at a pump output port 44, both in an output coupler 44. As a result, the input signal and conjugate signal are together automatically isolated from the pump signal and any corresponding ASE at the input/conjugate output port 43 of the frequency shifter, as in the embodiments described above.

Figure 9:
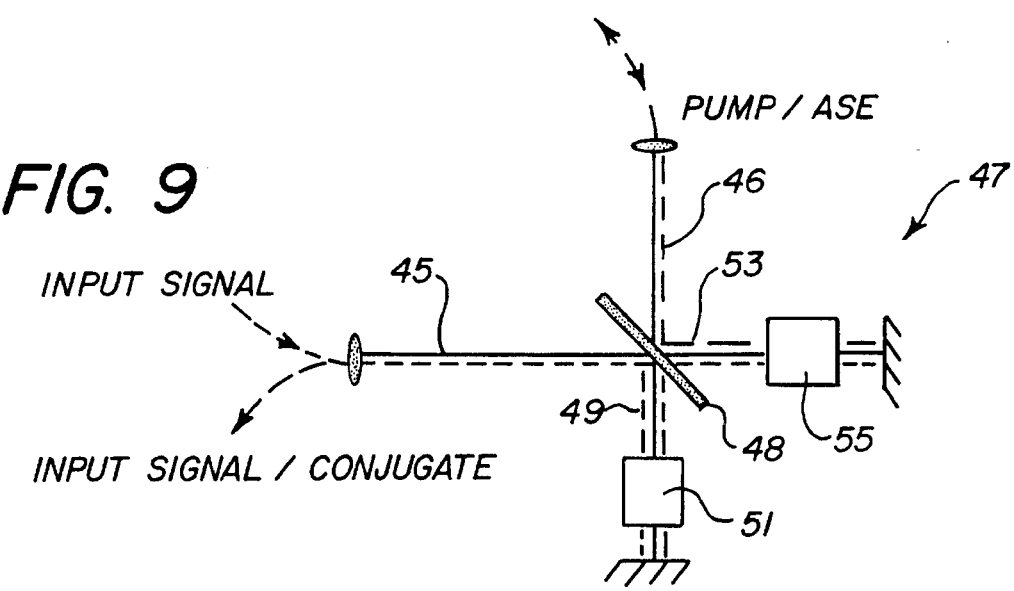
FIG. 9 is a schematic illustration of a fourth optical frequency shifter according to the invention, configured as a Michelson interferometer.

In a further adaptation of the interferometric frequency shifting scheme of the invention, as shown in FIG. 9, an input signal and a pump signal are independently injected into separate arms 45, 46, respectively, of a Michelson interferometric configuration 47. A beam splitter 48 is positioned to separate both the input signal and the pump/ASE signal into two components, so the first component of the input signal and the first component of the pump signal both traverse an interferometer arm 49, in which a nonlinear element 51 is positioned, and the second component of the input signal and the second component of the pump signal both traverse an interferometer arm 53, in which a nonlinear element 55 is also positioned.

Four wave mixing of the input signal and the pump signal occurs via the nonlinear elements 51, 55 to produce a conjugate signal, of a frequency that is shifted from that of the input signal. The input signal and generated conjugate signal then exit the interferometer by way of the arm 45 in which the input signal was injected, and the pump and any ASE separately exit the interferometer by way of the arm 46 in which the pump signal was injected. As a result, the input signal and conjugate signal are together automatically separated from the pump signal and any ASE signal.

Figure 10:
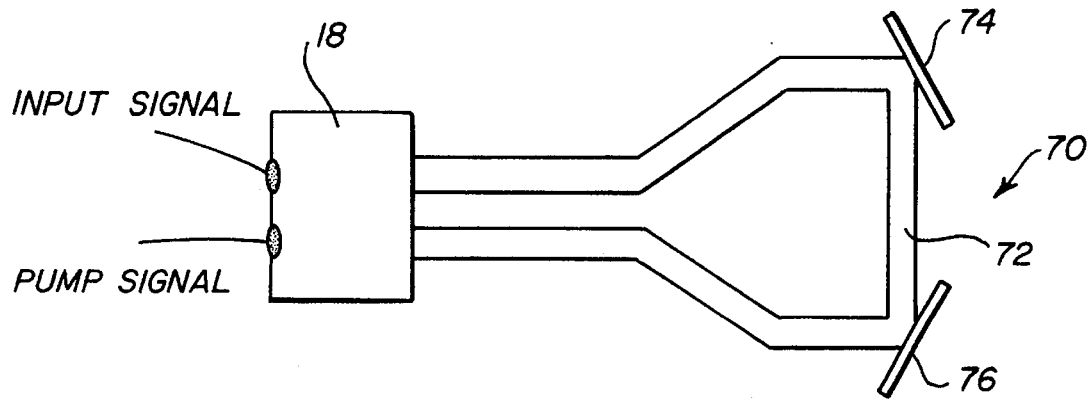
FIG. 10 is a schematic illustration of a fifth optical frequency shifter according to the invention, configured as a waveguide.

In yet a further adaptation of the interferometric frequency shifting scheme of the invention, as shown in FIG. 10, an optical loop mirror is formed of a waveguide 72 that produces a looped configuration by reflecting plates 74, 76, positioned along the length of the waveguide. As in earlier embodiments discussed previously, an input signal and a pump signal are separately and independently injected into the waveguide via a coupler 18. Four wave mixing of the input signal and the pump signal along the length of the waveguide generates a conjugate, frequency-shifted signal that is reflected and output from the waveguide with the input signal, automatically separated from the pump signal and any associated ASE. As will be understood by those skilled in the art, there exist other waveguide implementations that may configured according to the frequency shifting scheme of the invention.

Figure 11:
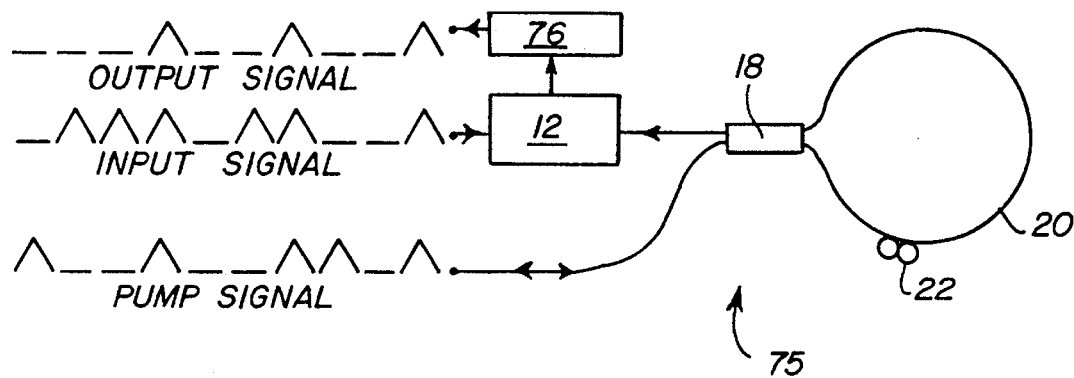
FIG. 11 is a schematic illustration of an optical AND gate according to the invention.

It will be recognized by those skilled in the field of optical communications that the frequency shifter designs of the invention described above accommodate both analog and digital optical signals. This capability is important for providing all-optical building blocks of optical computation processing equipment. For example, referring to FIG. 11, the invention provides an all-optical AND gate 75 whose operation is based on the optical interferometric scheme of the invention. The AND gate consists of an optical loop mirror 20, along the length of which a polarizer controller 22 may be positioned. An input signal made up of, e.g., a short pulse (or cw) data stream that comprises optical "bits" which each are a laser pulse or an empty time slot, is accepted at a loop mirror coupler 18 by way of a Faraday circulator 12. A pump laser is also input at the coupler 18, as in earlier embodiments described above. The pump laser signal here also comprises a pulse stream. The data stream and the pump pulse stream are synchronized in time and phase so that their corresponding bit time slots are synchronized.

Four wave mixing of the input signal and the pump signal pulse streams in the fiber loop mirror generates a conjugate signal pulse stream that is frequency-shifted from the input signal. This conjugate signal is reflected out of the loop mirror with the input signal and separated from the pump signal and any associated pump ASE. The combined input/conjugate signals then are injected back into the Faraday circulator 12, where they are directed to a filter 76 that filters the input signal out of the input/conjugate signal combination. The filtered output signal is a frequency-shifted pulse stream that represents a logical ANDing of the input and pump pulse streams.

This ANDing function is illustrated in the figure with an example input pulse signal stream and pump signal stream, which together produce the illustrated example output pulse stream; a pulse exists in those bit time slots of the output signal only for which a pulse is located in the corresponding bit time slot for both the input and pump signals. As will be recognized by those skilled in the art, the AND gate of the invention may be extended and utilized as a building block in all-optical digital processing equipment.

Figure 12:
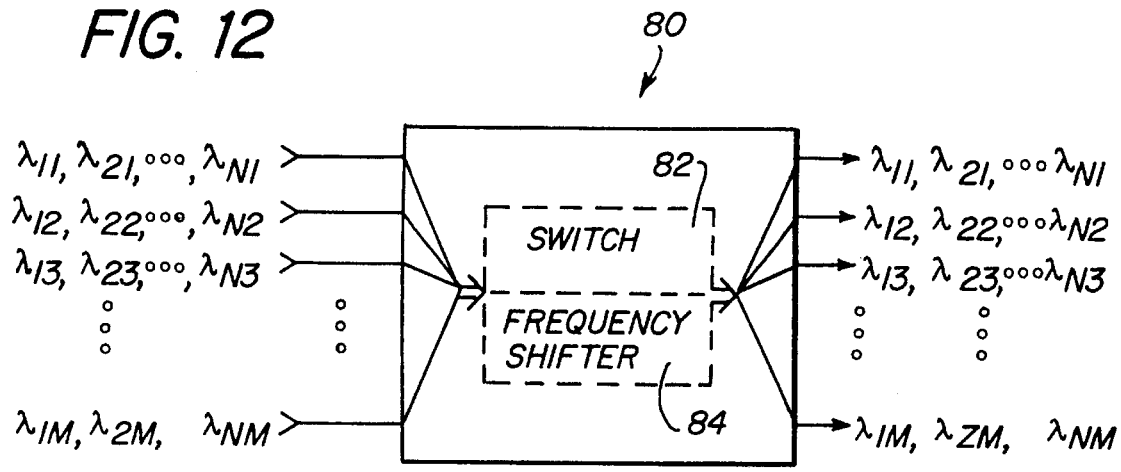
FIG. 12 is a schematic illustration of a multiwavelength cross-connect switch according to the invention.

Turning now to other applications, the frequency shifting scheme of the invention is flexibly adaptable to a wide range of optical network configurations and network processors. For example, as shown in FIG. 12, the frequency shifter of the invention may be incorporated into an all-optical multiwavelength cross-connect switch 80. Here any one of N different wavelengths may be input to the switch 80 via any one of M different fibers in an input fiber bank. The switch 80 spatially switches the input wavelength on each of the M input fibers to any fiber in a bank of M output fibers. In addition, the wavelength of a given input fiber may be frequency-shifted from its input wavelength to any other of the other N wavelengths before or after being switched to a given fiber in the output fiber bank. This combination of switching and frequency shifting mechanisms provides powerful cross-connect flexibility.

In the cross-connect switch, a switch 82 communicates with a frequency shifter 84 of the invention to provide combined switching and shifting in frequency of input signals. Wavelength demultiplexers and multiplexers (not shown) provide input and output coupling to the input and output fiber banks. As will be understood by those skilled in the art, the cross-connect switch 80 may include other appropriate multiplexing and other processing components for corresponding switching applications.

Figure 13:
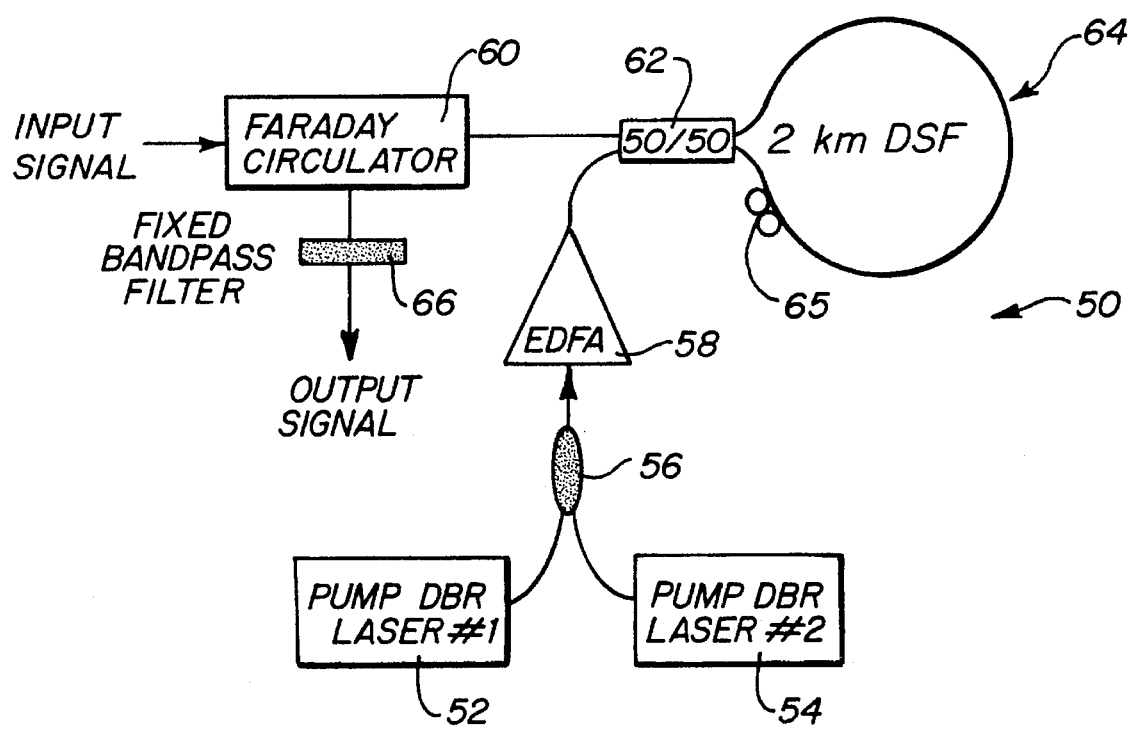
FIG. 13 is a schematic illustration of a sixth optical frequency shifter according to the invention including two pump laser inputs.

In enhancements of the frequency shifter of the invention, adaptations may be employed to reduce leak-through of pump power to the output channel to a level even lower than that inherently provided by the invention. It must be here noted that the basic frequency shifter configuration of the invention provides pump power suppression that is far superior to that provided by prior conventional frequency shifters, as mentioned above. If even further suppression is desired, the invention provides use of multiple laser pumps, as shown in FIG. 13.

Here, a frequency shifter 50 in accordance with the invention includes a first distributed Bragg reflector pump laser 52 and a second distributed Bragg reflector pump laser 54, the two laser pump signals being combined using, e.g., a standard 2×2 or WDM coupler 56. The lasers may each comprise, e.g., the same ATT M246AH laser described above. The combined laser pump signals may be amplified using a length of erbium-doped fiber amplifier 58, as was previously explained. A signal to be shifted in frequency is input at one port of a three-port Faraday circulator 60, though which the input signal is directed to a 50/50 optical coupler 62.

As was explained with reference to FIGS. 2A–2C, the input signal and combined pump signals are input to a fiber loop mirror, comprising a length of dispersion shifted fiber, e.g., Corning SMFDS fiber. The fiber may be set at a length appropriate for the range of expected wavelength conversion, based on, e.g., the conversion gain-fiber length relationships presented above, and may include a nonlinear or other element as described above for producing four wave mixing of the input and pump signals. A polarization controller 65 may be included in the fiber loop for maintaining the loop operation in a balanced state. As explained previously, the input signal and the conjugate signal produced by four wave mixing along the loop length are automatically together reflected out of the loop through a separate port from the pump signals. The input and conjugate signals then are directed back to the Faraday circulator 60, and the output signal is taken from the circulator, optionally after filtering by a fixed bandpass filter 66, as described below.

Figure 14:
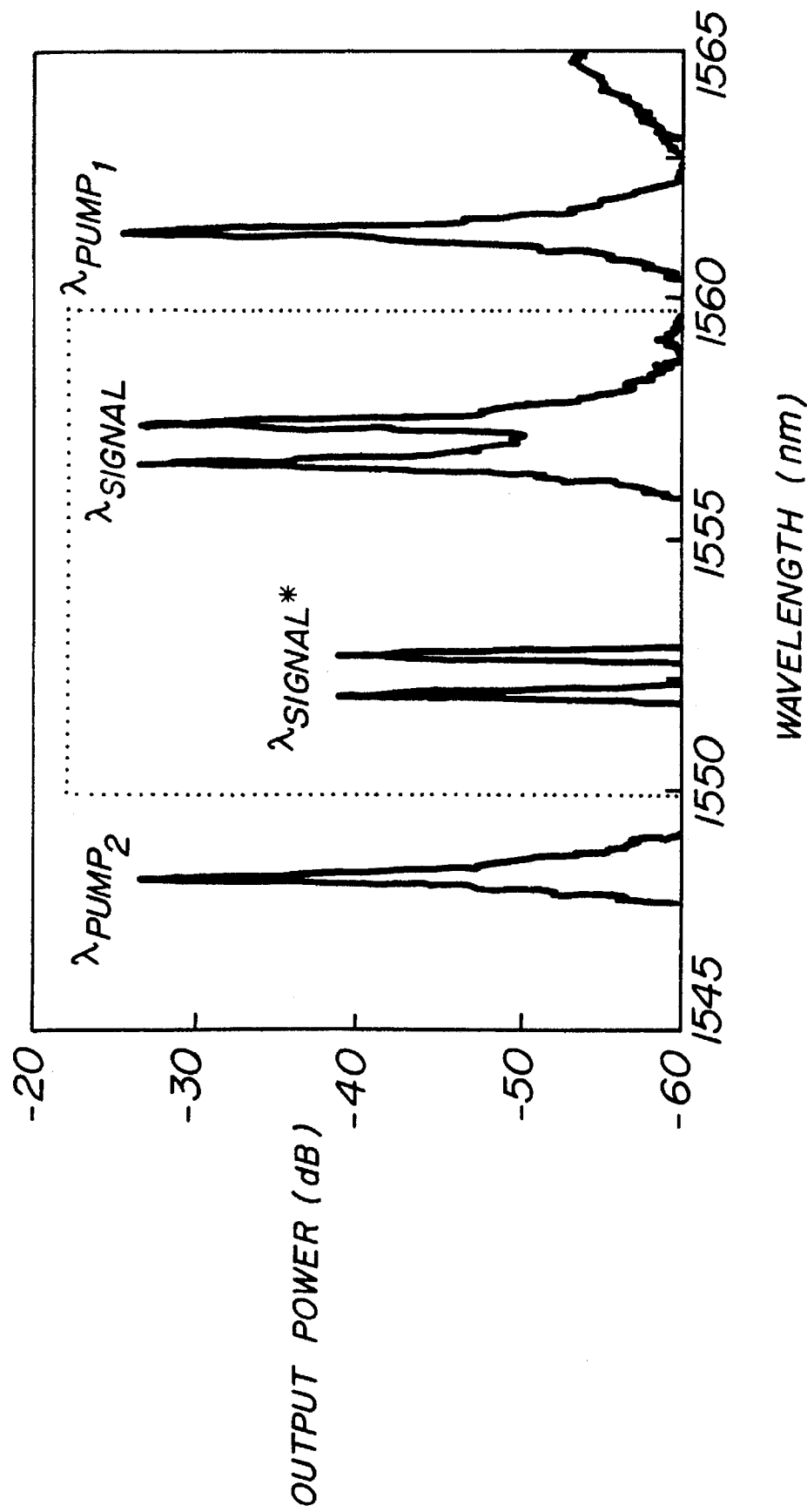
FIG. 14 is a graphical representation of the output power spectrum produced by the optical frequency shifter of FIG. 13.

Referring now to FIG. 14, this frequency shifter configuration may be extended for processing a bank of input signals, shown in the figure as $\lambda_{signal}$. Four wave mixing of such an input signal bank and the two pump signals as they traverse the fiber loop generates a bank of conjugate signals, shown as $\lambda_{signal}*$, frequency-shifted from the input signals. In situations for which the pump suppression characteristics of the frequency shifter of the invention are insufficient, a fixed bandpass filter 66 (FIG. 13) may be employed, as shown in FIG. 14, to entirely filter out pump wavelengths, which, as will be understood by those in the field, are selected to be outside of the filter pass band. In this way, a bank of input signals may be shifted from one center frequency to another with a minimum of pump and pump ASE leak through to the output signal bank.

The interferometric frequency shifter of the invention, as well as all of the various adaptations and enhancements just described, fundamentally overcomes many of the performance limitations of previous frequency shifter systems by utilizing a four wave mixing mechanism configured to automatically separate input and conjugate signals from pump and pump ASE signals. This design achieves a conversion efficiency as high as −13 dB over a wide bandwidth of input and output wavelength space of 1.24 THz, while providing more than 30 dB of pump and pump ASE cancellation. As explained previously, this performance meets the demands of a wide range of optical communication applications, such as reconfigurable WDM network schemes, where rapidly tunable frequency conversion is necessary, and provides high-speed optical processing modules, e.g., optical AND gates. As will be recognized by those skilled in the field of optical communications, variations of the frequency shifter design and applications beyond those particularly described here are within the scope of the invention. Accordingly, the invention is not meant to be limited only to the foregoing description, but by the scope and spirit of the claims.

I claim:

1. An optical wavelength converter comprising:

a signal port for accepting an input optical signal, of a first wavelength, to be processed for producing an output signal of a second wavelength;

a pump port for accepting a laser pump signal of a pump wavelength; and an optical interferometer connected to the signal port and pump port to separately receive the input signal from the signal port and the pump signal from the pump port, and comprising a nonlinear medium characterized by a nonlinear optical property, connected for separate injection of the input signal and the pump signal into the nonlinear medium, the nonlinear optical property of the nonlinear medium producing nonlinear interaction of the separately injected input signal and the pump signal to generate an output conjugate signal of a second wavelength based on the input signal first wavelength and the pump signal wavelength.

2. The optical wavelength converter of claim 1 wherein the nonlinear medium comprises a material characterized by a nonlinear optical property that produces four wave mixing of the input signal and the pump signal.

3. The optical wavelength converter of claim 2 further comprising a tunable optical filter for filtering the pump signal before it is accepted at the pump port.

4. The optical wavelength converter of claim 1 wherein the signal port to output the pump port comprise ports of a 50/50 optical coupler.

5. The optical wavelength converter of claim 1 wherein the optical interferometer is connected to the signal port and the pump port to emit the input signal and output conjugate signal out of the signal port and to separately emit the pump signal out of the pump port.

6. The optical wavelength converter of claim 5 wherein the optical interferometer comprises a fiber loop mirror.

7. The optical wavelength converter of claim 6 further comprising a polarization controller positioned in the fiber loop mirror for maintaining the loop mirror in a polarization-balanced condition.

8. The optical wavelength converter of claim 6 wherein the fiber loop mirror comprises a loop of single-mode dispersion-shifted optical fiber.

9. The optical wavelength converter of claim 8 wherein the fiber loop mirror comprises a loop of single-mode dispersion-shifted optical fiber of between 1 m and 10 km in length.

10. The optical wavelength converter of claim 9 wherein the nonlinear fiber loop mirror comprises a loop of single-mode dispersion-shifted optical fiber of between 500 m and 8 km in length.

11. The optical wavelength converter of claim 8 wherein the single-mode dispersion-shifted optical fiber is characterized by a zero-dispersion wavelength equal to a wavelength between the input signal wavelength and the conjugate signal wavelength.

12. The optical wavelength converter of claim 6 further comprising a tunable laser pump source for generating a pump signal to be accepted at the pump port.

13. The optical wavelength converter of claim 12 wherein the tunable laser pump source comprises a pair of independently tunable laser pump sources for generating a combined pump signal to be accepted at the pump port.

14. The optical wavelength converter of claim 12 further comprising a length of optical fiber for amplifying the pump signal before it is accepted at the pump port.

15. The optical wavelength converter of claim 14 wherein the length of optical fiber for amplifying the pump signal comprises a length of rare earth-doped optical fiber.

16. The optical wavelength converter of claim 6 further comprising a semiconductor component positioned at a point along the fiber loop.

17. The optical wavelength converter of claim 5 further comprising a Faraday circulator with a first port configured to accept an input optical signal and direct the input signal to the signal port, and a second port connected to the signal port to output the generated output conjugate signal.

18. The optical wavelength converter of claim 17 further comprising a tunable optical filter for selecting the conjugate signal output at the second port of the Faraday circulator.

19. The optical wavelength converter of claim 5 wherein the input signal and generated output conjugate signal comprise analog optical signals.

20. The optical wavelength converter of claim 5 wherein the input signal and generated output conjugate signal comprise digital optical signals.

21. The optical wavelength converter of claim 5 wherein the input signal and generated output conjugate signal comprise a plurality of optical signals.

22. The optical wavelength converter of claim 5 wherein the optical interferometer comprises a semiconductor component.

23. The optical wavelength converter of claim 5 wherein the optical interferometer comprises a Mach Zehnder interferometer.

24. The optical wavelength converter of claim 5 wherein the optical interferometer comprises a Michelson interferometer.

25. The optical wavelength converter of claim 5 wherein the optical interferometer comprises a waveguide.

26. The optical wavelength converter of claim 5 wherein the input signal and pump signal each comprise a pulse train, the input signal pulse train being synchronized in time and phase with the pump signal pulse train, and wherein the nonlinear optical property of the nonlinear medium produces nonlinear interaction between the input signal and pump signal pulse trains to generate a conjugate output signal pulse train, the conjugate output signal pulse train representing a logical ANDing of the input signal and pump signal pulse trains.

27. The optical wavelength converter of claim 1 wherein the input signal is carried by a first optical fiber, and further comprising a switch connected to the signal port to direct the conjugate output signal to a second optical fiber.

\* \* \* \* \*

UNITED STATES PATENT AND TRADEMARK OFFICE
CERTIFICATE OF CORRECTION

PATENT NO. : 5,619,368
DATED : April 8, 1997
INVENTOR(S) : Eric A. Swanson

It is certified that error appears in the above-indentified patent and that said Letters Patent is hereby corrected as shown below:

Column 13,
  Claim 4, line 2, "signal port to output the pump"

should read --signal port and the pump--.

Signed and Sealed this

Nineteenth Day of August, 1997

*Attest:*

BRUCE LEHMAN

*Attesting Officer*     *Commissioner of Patents and Trademarks*